US012679265B2

(12) United States Patent
Killeen

(10) Patent No.: US 12,679,265 B2
(45) Date of Patent: Jul. 14, 2026

(54) APPARATUS, SYSTEM, AND METHOD FOR VIBRATION DAMPED CUP-HOLDER

(71) Applicant: Toyota Motor Engineering & Manufacturing North America, Inc., Plano, TX (US)

(72) Inventor: Matthew K. Killeen, Ypsilanti, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA

( * ) Notice: Subject to any disclaimer, the term of this patent is extended or adjusted under 35 U.S.C. 154(b) by 412 days.

(21) Appl. No.: 18/370,206

(22) Filed: Sep. 19, 2023

(65) Prior Publication Data

US 2025/0091498 A1　　Mar. 20, 2025

(51) Int. Cl.
*B60N 3/10* (2006.01)

(52) U.S. Cl.
CPC ............. *B60N 3/10* (2013.01); *Y10S 224/926* (2013.01)

(58) Field of Classification Search
CPC ...... Y10S 224/926; B60N 3/108; B60N 3/103
See application file for complete search history.

(56) References Cited

U.S. PATENT DOCUMENTS

| | | | |
|---|---|---|---|
| 4,474,354 A | 10/1984 | Field | |
| 5,275,779 A | 1/1994 | Marfilius et al. | |
| 6,511,036 B1 | 1/2003 | Hansen | |
| 6,712,325 B2 | 3/2004 | Choi | |
| 7,500,443 B1 | 3/2009 | Allen | |
| 7,866,620 B2 | 1/2011 | Kaemmer | |
| 10,086,736 B1 | 10/2018 | Jacobsen et al. | |
| 10,315,551 B2 * | 6/2019 | Filipovich | B60R 11/02 |
| 2018/0154815 A1 * | 6/2018 | Karges | B60N 3/10 |
| 2019/0084463 A1 * | 3/2019 | Boundy | B60N 3/102 |
| 2021/0402907 A1 * | 12/2021 | Adams | B60N 3/103 |
| 2022/0287490 A1 | 9/2022 | Singleton | |

FOREIGN PATENT DOCUMENTS

| | | |
|---|---|---|
| CN | 201800608 U | 4/2011 |
| CN | 206406792 U | 8/2017 |
| CN | 109131002 A | 1/2019 |
| CN | 213082986 U | 4/2021 |
| JP | 8295169 A | 11/1996 |
| JP | 3706536 B2 | 10/2005 |
| KR | 101886385 B1 | 8/2018 |

* cited by examiner

*Primary Examiner* — Robert E Fuller
(74) *Attorney, Agent, or Firm* — Snell & Wilmer LLP

(57) ABSTRACT

A grommet extends between a container receptacle and a vehicle panel. As the vehicle panel moves, the grommet is designed to flex (e.g., stretch and/or compress) to mitigate and/or eliminate movement of the container receptacle. Hence, the container receptacle is isolated from the vehicle panel via the grommet.

19 Claims, 5 Drawing Sheets

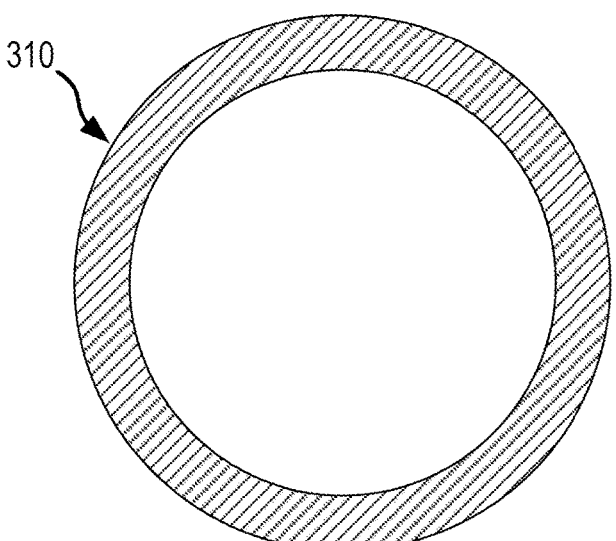
310
FIG.3
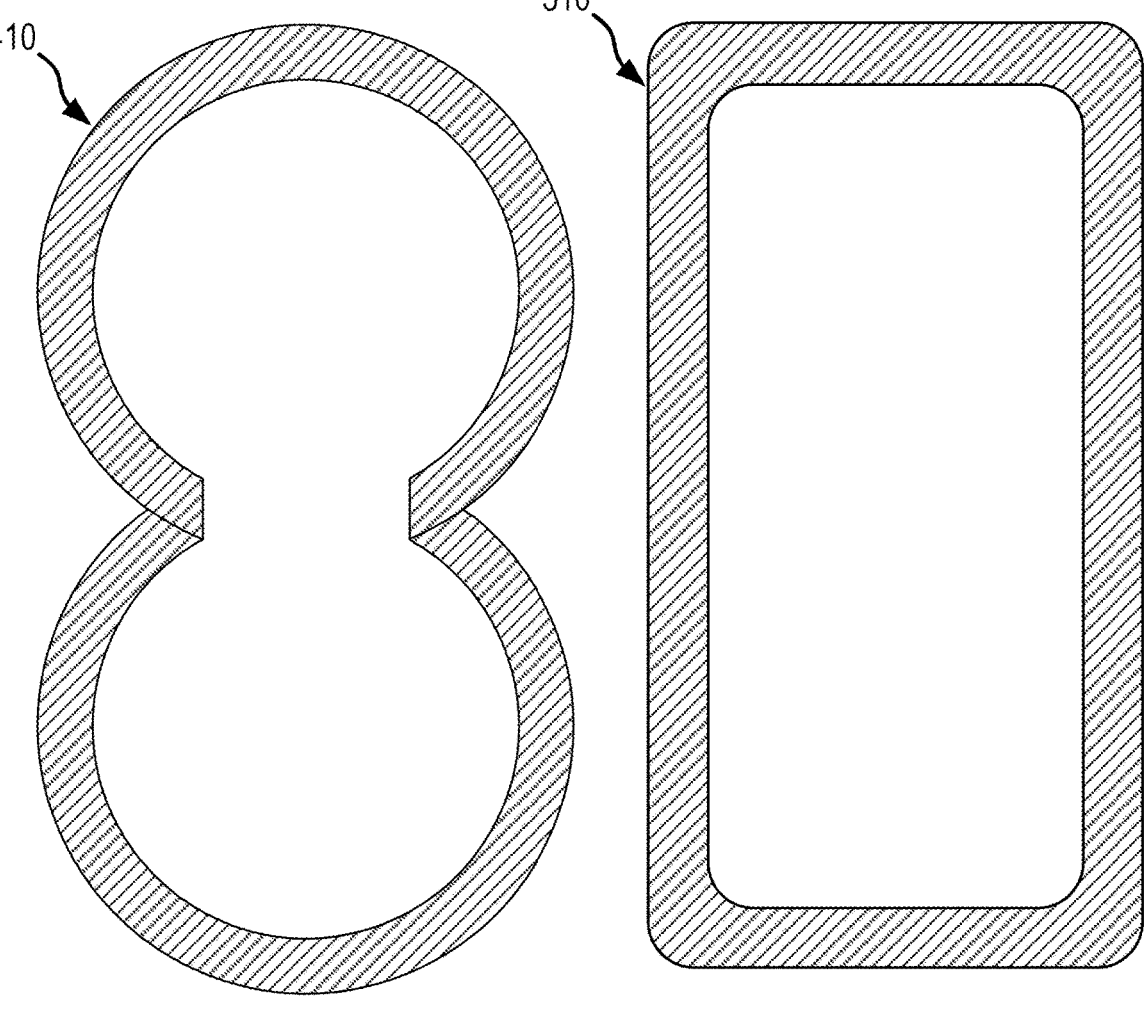
410
510
FIG.4          FIG.5

APPARATUS, SYSTEM, AND METHOD FOR VIBRATION DAMPED CUP-HOLDER

BACKGROUND

Field

The present disclosure relates to apparatuses, systems, and methods for cup holders and, more particularly, to apparatuses, systems, and methods for securing a cup within an interior of a vehicle.

Description of the Related Art

Most vehicles include one or more cup holders for the convenience of a driver and/or a passenger(s) of the vehicle. The cup holders enhance the ability of the driver to access beverages while operating and/or riding in the vehicle. During vehicle operation, the vehicle can be subject to movement and/or vibration as a result of various driving conditions—e.g., rough terrain, potholes, sudden accelerations/decelerations, turns around corners, passing other vehicles, etc. Conventional cup holders are mounted to the vehicle such that movement and/or vibration of the vehicle is transferred to the cup holder which increases the likelihood of fluid spillage due to the movement and/or vibration of the vehicle.

Accordingly, there is a need for an apparatus, system and/or method for retaining a beverage within a vehicle that is subject to sudden movements and/or vibrations.

SUMMARY

In general, one aspect of the subject matter described in this disclosure may be embodied in an apparatus for a vehicle. The apparatus includes a vehicle panel, a container receptacle configured to receive a beverage container, and a grommet extending from the container receptacle. The grommet is configured to extend between and to the container receptacle and the vehicle panel. The container receptacle is isolated from the vehicle panel via the grommet.

These and other embodiments may optionally include one or more of the following features. The container receptacle can define a central axis and the grommet can extend radially outward from the container receptacle. The grommet can include a central portion extending at an angle of between twenty (20) degrees and eighty (80) degrees with respect to the central axis. The central portion can be configured to at least one of compress or stretch to absorb a vibration in the vehicle panel. The angle can vary in response to the vehicle panel moving with respect to the container receptacle.

The container receptacle can include a lip extending radially outward from a central axis of the container receptacle, and the grommet is located at least partially between the lip and the vehicle panel. The vehicle panel can define an opening configured to receive the container receptacle, and the lip can overlap the vehicle panel.

The container receptacle can define a central axis and the grommet can be coupled to the container receptacle at a first axial location. The grommet can be coupled to the vehicle panel at a second axial location. The first axial location is axially spaced apart from the second axial location.

The container receptacle includes a plurality of support ribs extending longitudinally along an exterior surface of the container receptacle, each of the support ribs includes a slot configured to accommodate the grommet. The vehicle panel can define a plurality of apertures, each aperture is configured to receive a respective attachment portion of the grommet for securing an outer portion of the grommet to the vehicle panel. The grommet can surround the container receptacle. A shape of the grommet can correspond to a shape of the container receptacle. The grommet can be coupled to an upper end of the container receptacle.

In another aspect, the subject matter may be embodied in a vehicle cup holder. The vehicle cup holder can include a vehicle panel, an opening disposed in the vehicle panel, and a container receptacle configured to receive a beverage container, the container receptacle extends through the opening in the vehicle panel, and a grommet extending between and to the container receptacle and the vehicle panel. The container receptacle is isolated from the vehicle panel via the grommet.

These and other embodiments may optionally include one or more of the following features. The container receptacle can be moveable with respect to the vehicle panel. The grommet can define a closed loop and can surround an exterior surface of the container receptacle. The container receptacle can be mounted to the vehicle panel with the grommet.

In another aspect, the subject matter may be embodied in a method. The method can include positioning a container receptacle to extend through an opening in a vehicle panel, the container receptacle is configured to receive a beverage container. The method can further include positioning a grommet to extend between and to the container receptacle and the vehicle panel. The method can further include isolating the container receptacle from the vehicle panel via the grommet.

These and other embodiments may optionally include one or more of the following features. The method can further include absorbing a vibration of the vehicle panel with the grommet. The method can further include positioning a portion of the grommet in a slot disposed on an exterior surface of the container receptacle. The method can further include moving an attachment portion of the grommet at least partially through an aperture disposed in the vehicle panel.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views, wherein:

FIG. 3 is a schematic view of a grommet for a vehicle cup holder apparatus according to an embodiment of the present disclosure;

FIG. 4 is a schematic view of a grommet for a vehicle cup holder apparatus according to an embodiment of the present disclosure; and FIG. 5 is a schematic view of a grommet for a vehicle cup holder apparatus according to an embodiment of the present disclosure.

DETAILED DESCRIPTION

The present disclosure describes apparatuses, systems, and methods for vehicle article holders, such as a cup holder, for example. For instance, an apparatus includes a container receptacle configured to receive an article, such as a beverage container, and a flexible grommet whereby the container receptacle is mounted to a vehicle panel. The grommet is designed to extend between the container receptacle and the vehicle panel, whereby the grommet facilitates movement of the vehicle panel with respect to the container receptacle. The grommet is further designed to reduce or eliminate loads (e.g., vibrations) from being transferred from the vehicle panel to the beverage container. Accordingly, the grommet isolates the container receptacle from movement and/or vibration of the vehicle panel.

The grommet is designed to stretch and compress when the vehicle panel moves (e.g., in a reciprocating manner) with respect to the container receptacle. The grommet can extend around an exterior surface of the container receptacle and attach to the vehicle panel at an opening therein. The container receptacle can extend through the vehicle panel opening. By isolating the container receptacle from the vehicle panel, a vehicle can experience sudden movements (e.g., acceleration, deceleration, vibrations, side-to-side movement, up and down movement, etc.) while securing an article such as a beverage in the container receptacle and mitigating or eliminating the risk of spillage of the article or beverage.

Figure 1A:
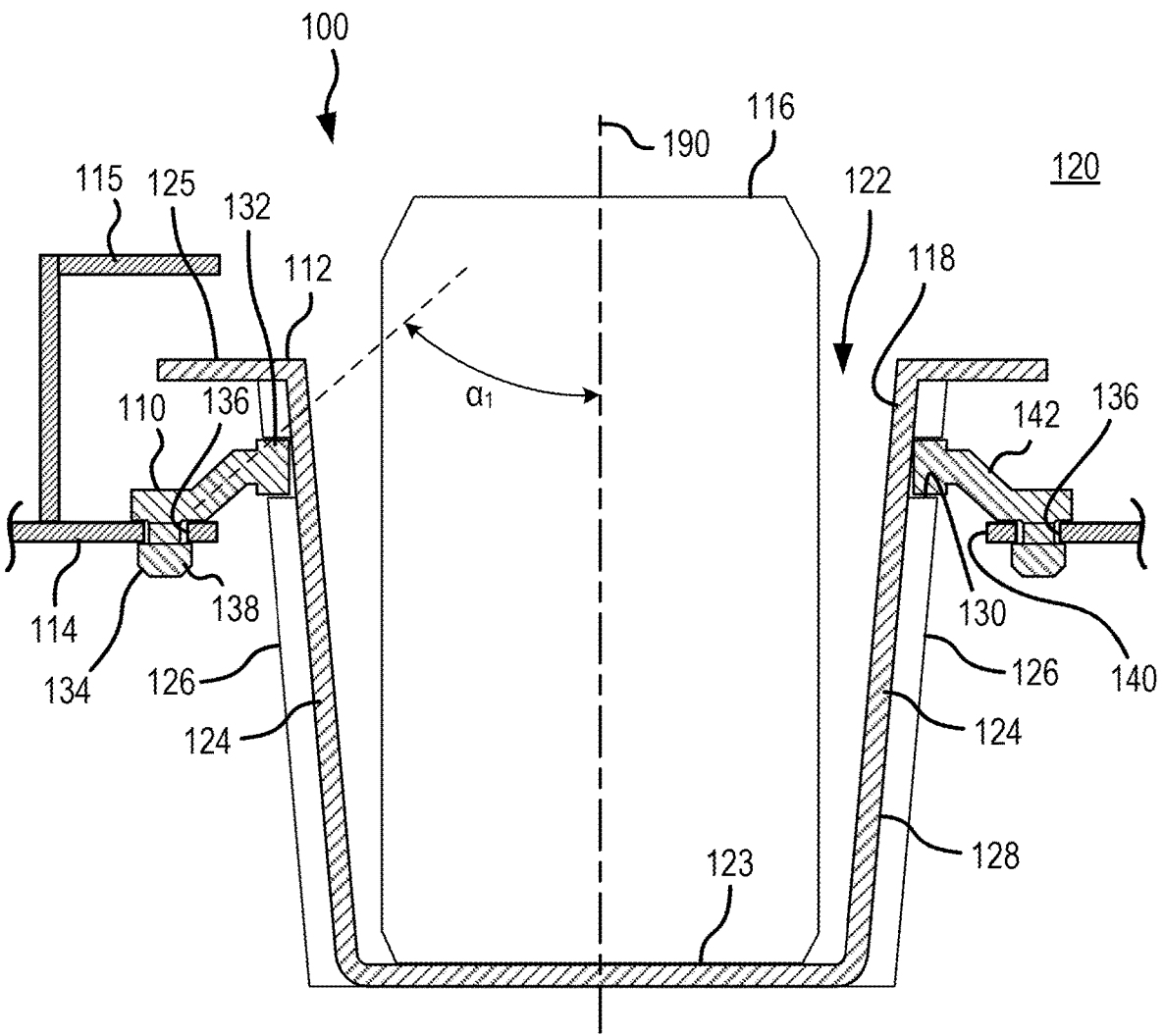
FIG. 1A is a schematic section view of a vehicle cup holder apparatus with a grommet isolating a container receptacle from a vehicle panel according to an embodiment of the present disclosure.

Referring to the drawings, wherein like reference numbers correspond to like or similar components throughout the various figures, FIG. 1A generally shows an apparatus 100 (also referred to herein as a cup holder) for a vehicle having a grommet 110 configured to isolate a container receptacle 112 from a vehicle or a vehicle component (e.g., a vehicle panel 114). The vehicle panel 114 can be part of a vehicle dash, console, door panel, seat, or any other vehicle panel or part suitable where it may be desirable to locate a cup holder. The vehicle panel 114 can be an interior vehicle panel, for example, located within a cabin of the vehicle.

The container receptacle 112 can be configured to receive and/or secure an article, such as a beverage container 116 (e.g., a cup, a can, a mug, a bottle, or the like), in a vehicle (e.g., a moving vehicle). The container receptacle 112 includes a main body 118. As shown, the main body 118 defines a generally cylindrical recess (e.g., a cavity) 122.

The main body 118 may define any number of recesses in any suitable shape depending on the desired application.

The main body 118 can include a bottom surface 123 and one or more sidewalls 124 extending from the bottom surface 123. The main body 118 can define a central axis 190. The central axis 190 can extend substantially vertically when the container receptacle 112 is installed in the vehicle as it is desirable to hold the beverage container 116 upright in the container receptacle 112. As shown, a plurality of support ribs 126 can extend from an exterior surface 128 of the sidewall 124. In various embodiments, the container receptacle 112 (i.e., the main body 118 and the plurality of support ribs 126) is made as a single, monolithic structure. For example, the container receptacle 112 can be made as an injection molded plastic structure. Each of the support ribs 126 can define a slot 130 extending perimetrically around the main body 118 (e.g., the sidewalls 124). The main body 118 can be made of any suitable material, such as an elastomer, a thermoset or a thermoplastic, or any material suitable for receiving and supporting an article within an interior 120 of the vehicle.

The container receptacle 112 can further include a lip 125 extending radially outward from the central axis 190 of the container receptacle 112. The grommet 110 is located at least partially between the lip 125 and the vehicle panel 114. The lip 125 can overlap (i.e., in the radial direction) the vehicle panel 114. In this manner, the lip 125 can cover the grommet 110 and thereby enhance the overall appearance of the apparatus 100 and prevent unwanted contact to the grommet 110. In various embodiments, the apparatus includes a flange 115 extending from the vehicle panel 114 and over the lip 125. The flange 115 can overlap (i.e., in the radial direction) the lip 125. The flange 115 can be spaced apart from the vehicle panel 114 and provide sufficient space for the lip 125 to move vertically with respect to the vehicle panel 114 and the flange 115. In this manner, the flange 115 can cover the grommet 110 and/or the lip 125 and thereby enhance the overall appearance of the apparatus 100 and prevent unwanted contact to the grommet 110 and/or the lip 125.

The grommet 110 can extend between and to the exterior surface 128 of the container receptacle 112 and the vehicle panel 114. The grommet 110 can be coupled to an upper end of the container receptacle 112. The grommet 110 can define a closed loop that surrounds the exterior surface 128 of the container receptacle 112. The container receptacle 112 can be mounted to the vehicle panel 114 via the grommet 110. In this regard, the grommet 110 can support the container receptacle 112. Stated differently, the container receptacle 112 can be suspended and/or spaced apart from the grommet 110. An inner portion 132 of the grommet 110 can be positioned in the slot 130. In this manner, the grommet 110 can be secured to the container receptacle 112. Although shown as disposed in the plurality of support ribs 126, the slot 130 can additionally or alternatively be disposed in the exterior surface 128 of the sidewall 124. The grommet 110 can be secured to the container receptacle 112 in any suitable manner, including by adhering the grommet 110 to the exterior surface 128 and/or over molding the grommet 110 to the exterior surface 128.

An outer portion 134 of the grommet 110 is coupled to the vehicle panel 114. For example, a plurality of apertures 136 can be disposed in the vehicle panel 114, each aperture 136 configured to receive a respective attachment portion 138 of the grommet 110 for securing an outer portion 134 of the grommet 110 to the vehicle panel 114. The attachment portion 138 can be made of a pliable material. The attachment portion 138 can be a pliable button, knob, or stud. The attachment portion 138 can be configured to extend through the respective aperture 136. The attachment portion 138 can be compressed to fit through the aperture 136 and then return to its original shape to stop the attachment portion 138 from being pulled back through the aperture 136.

With reference to FIG. 1A, an opening 140 can be disposed in the vehicle panel 114. The container receptacle 112 can extend through the opening 140. The plurality of apertures 136 can be disposed adjacent to the opening 140. The grommet 110 can further include a central portion 142 extending between and to the inner portion 132 and the outer portion 134. The outer portion 134 can be axially offset from the inner portion 132. Stated differently, the grommet 110 can be coupled to the container receptacle 112 at a first axial location and coupled to the vehicle panel 114 at a second axial location, where the first axial location is axially spaced apart from the second axial location.

Figure 1B:
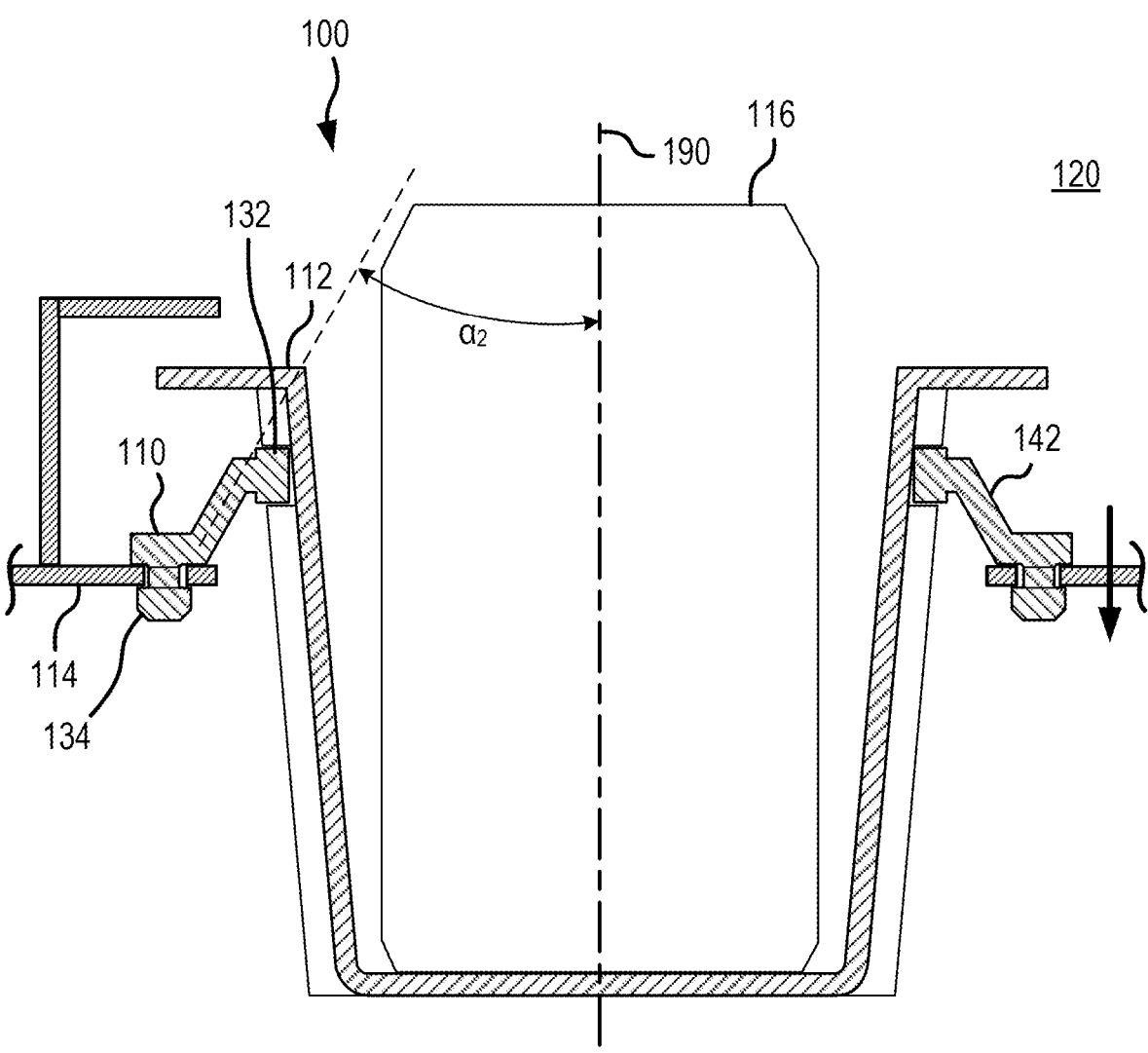
FIG. 1B is a schematic section view of the vehicle cup holder apparatus of FIG. 1A with the vehicle panel moved in a first direction and the grommet in a stretched state according to an embodiment of the present disclosure.
Figure 1C:
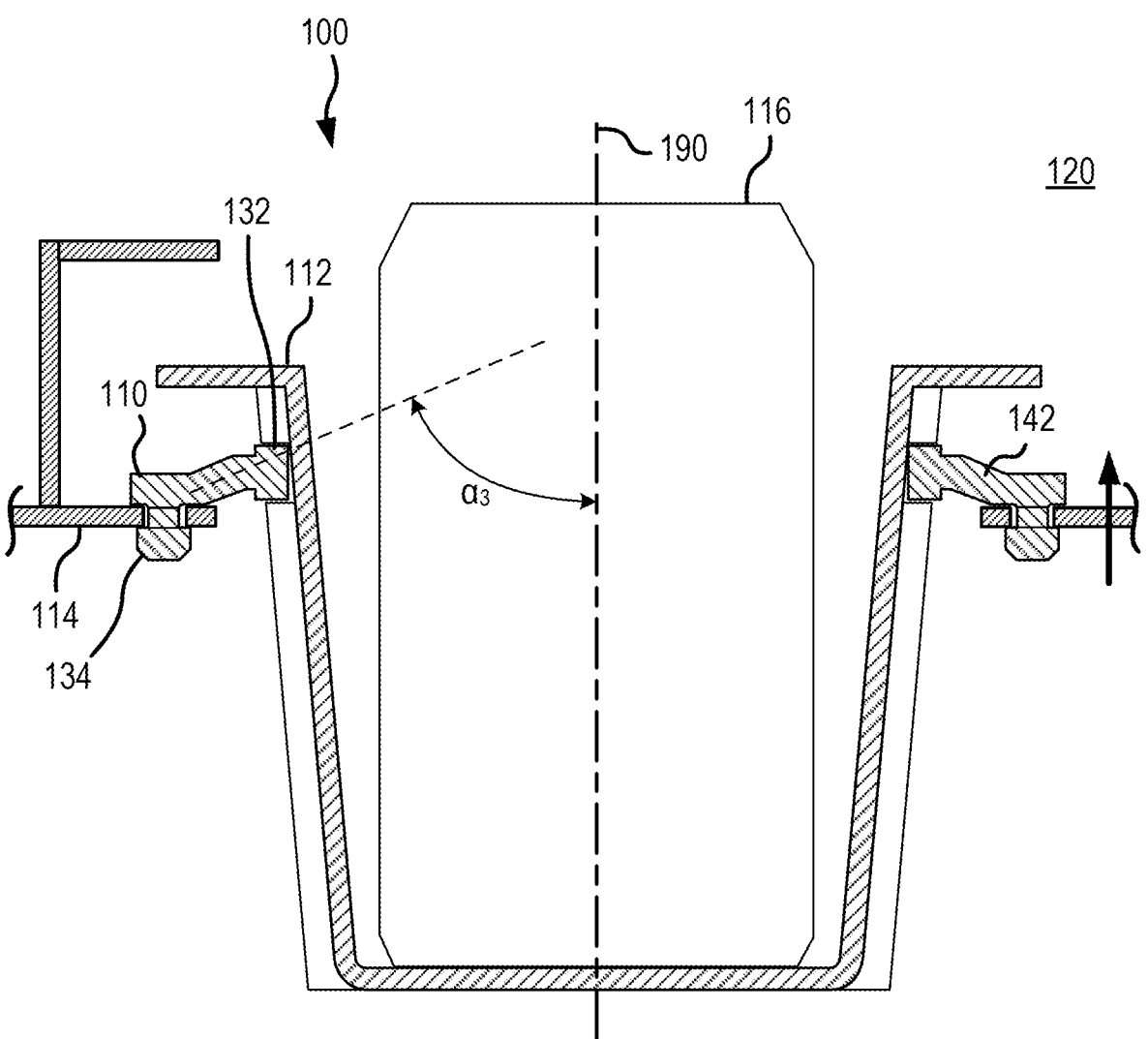
FIG. 1C is a schematic section view of the vehicle cup holder apparatus of FIG. 1A with the vehicle panel moved in a second direction and the grommet in a compressed state according to an embodiment of the present disclosure.

The central portion 142 can be oriented at an angle $\alpha_1$ with respect to the central axis 190. The central portion 142 can extend radially outward from the central axis 190 at the angle $\alpha_1$, which can be between about twenty (20) degrees and about eighty (80) degrees with respect to the central axis 190. The angle $\alpha_1$ can vary in response to the vehicle panel 114 moving with respect to the container receptacle 112. The central portion 142 can be configured to at least one of compress or stretch to absorb a movement and/or a vibration in or of the vehicle panel 114. For example, FIG. 1B shows the vehicle panel 114 moved in a first direction with respect to the container receptacle 112 and the central portion 142 stretched from its original or neutral state as shown in FIG. 1A. In the stretched state, the central portion 142 can be at an angle $\alpha_2$ with respect to the central axis 190. In some embodiments, angle $\alpha_2$ can be less than or equal to angle $\alpha_1$. FIG. 1C shows the vehicle panel 114 moved in a second direction, opposite the first direction, with respect to the container receptacle 112 and the central portion 142 compressed from its original or neutral state as shown in FIG. 1A. In the compressed state, the central portion 142 can be at an angle $\alpha_3$ with respect to the central axis 190. In some embodiments, angle $\alpha_3$ can be greater than or equal to angle $\alpha_1$. The grommet 110 can be made of a pliable material, such as an elastomeric material, such that the grommet 110 absorbs energy from the vehicle panel 114 in response to the vehicle panel 114 moving with respect to the container receptacle 112. Accordingly, the grommet 110 can be configured to absorb movements, vibrations and/or sudden acceleration/deceleration of the vehicle panel 114 to thereby isolate the container receptacle 112 from vehicle vibrations and prevent spillage of the beverage container 116.

With reference to FIG. 1A, the apparatus 100 can be assembled or installed by positioning the container receptacle 112 to extend through the opening 140 in the vehicle panel 114. The grommet 110 can be positioned to extend between and to the container receptacle 112 and the vehicle panel 114. As the vehicle and the vehicle panel 114 moves and/or vibrates, the grommet 110 can isolate the container receptacle 112 from the vehicle panel 114. The grommet 110 can absorb vibration of the vehicle panel 114 and reduce and/or eliminate the vibrations being transferred from the vehicle panel 114 to the container receptacle 112. The grommet 110 can be attached to the container receptacle 112 by disposing the inner portion 132 of the grommet 110 in the slot 130 disposed on the exterior surface 128 of the container receptacle 112. The grommet 110 can be attached to the vehicle panel 114 by disposing the attachment portion 138 of the grommet 110 at least partially through the aperture 136 (e.g., by disposing each of the attachment portions 138 of the grommet 110 at least partially through a respective aperture 136) disposed in the vehicle panel 114.

Figure 2A:
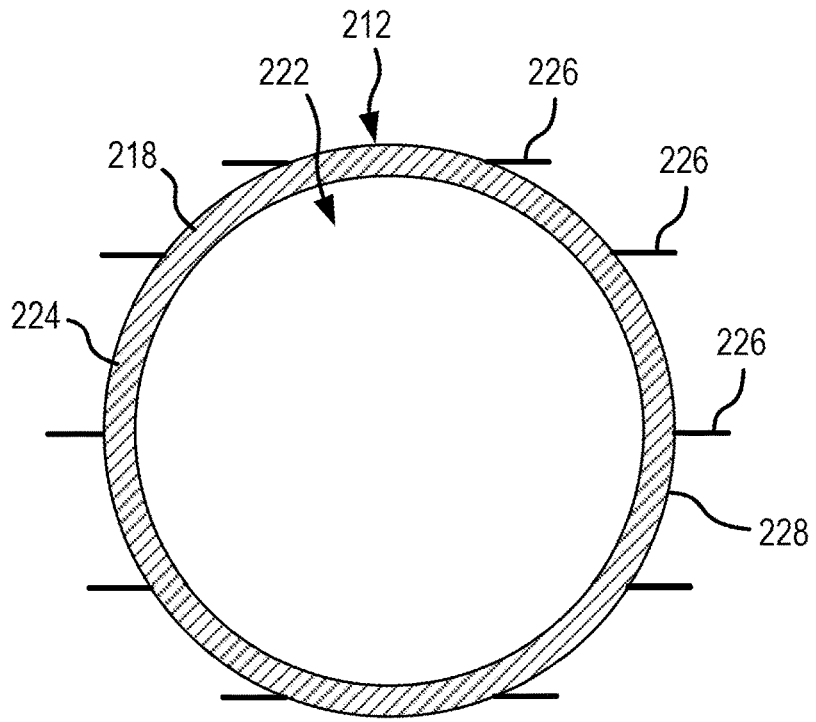
FIG. 2A is a section view of a container receptacle according to an embodiment of the present disclosure.

FIG. 2A shows a section view of a container receptacle 212, in accordance with various embodiments. The container receptacle 112 of FIG. 1A can be similar to the container receptacle 212. The container receptacle 212 includes a main body 218 defining a generally cylindrical recess (e.g., a cavity) 222. A plurality of support ribs 226 can extend from an exterior surface 228 of a sidewall 224 of the container receptacle 212. The plurality of support ribs 226 can each extend in the same direction (e.g., left to right in FIG. 2A) from the exterior surface 228.

Figure 2B:
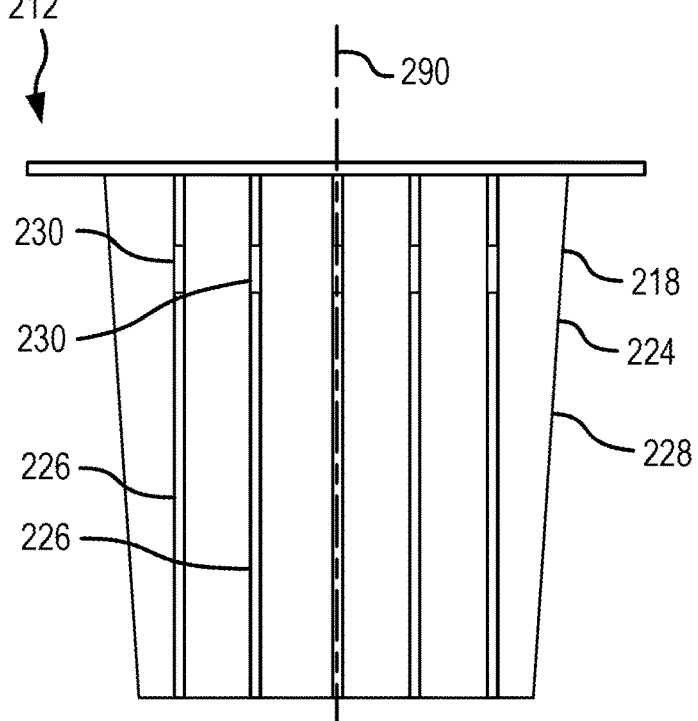
FIG. 2B is a side view of the container receptacle of FIG. 2A according to an embodiment of the present disclosure.

FIG. 2B shows a side view of the container receptacle 212, in accordance with various embodiments. The plurality of support ribs 226 can each be oriented vertically (e.g., parallel with central axis 290) along the exterior surface 228. Each support rib 226 can have a slot 230 for receiving a grommet, such as grommet 110 of FIG. 1A, for mounting the container receptacle 212 to a vehicle.

FIG. 3 schematically illustrates a grommet 310 having a cylindrical shape, for example, for a single container receptacle. Grommet 310 defines a closed loop.

FIG. 4 schematically illustrates a grommet 410 having a figure eight or hourglass shape, for example, for a double container receptacle. The grommet 410 defines a closed loop.

FIG. 5 schematically illustrates a grommet 510 having a generally rectangular shape, for example, for a double container receptacle. The grommet 510 defines a closed loop. The shape of the grommet 510 can be configured to correspond to a shape of the container receptacle to which the grommet 510 is configured to attach.

Where used throughout the specification and the claims, "at least one of A or B" includes "A" only, "B" only, or "A and B." Exemplary embodiments of the apparatuses, the systems, and the methods described herein have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. An apparatus for a vehicle, the apparatus comprising:
   a vehicle panel;
   a container receptacle configured to receive a beverage container and defining a central axis; and
   a grommet extending from the container receptacle, the grommet is configured to extend between and to the container receptacle and the vehicle panel, the grommet includes a central portion extending between an inner portion secured to the container receptacle and an outer portion secured to the vehicle panel, the central portion extending at an angle of between twenty degrees and eighty degrees with respect to the central axis of the container receptacle and configured to at least one of compress or stretch to absorb a vibration in the vehicle panel, and the container receptacle is isolated from the vehicle panel via the grommet.

2. The apparatus of claim 1, wherein the grommet extends radially outward from the container receptacle.

3. The apparatus of claim 1, wherein the angle varies in response to the vehicle panel moving with respect to the container receptacle.

4. The apparatus of claim 1, wherein the container receptacle includes a lip extending radially outward from the central axis of the container receptacle, and the grommet is located at least partially between the lip and the vehicle panel.

5. The apparatus of claim 4, wherein the vehicle panel defines an opening configured to receive the container receptacle, and the lip overlaps the vehicle panel.

6. The apparatus of claim 1, wherein the grommet is coupled to the container receptacle at a first axial location, the grommet is coupled to the vehicle panel at a second axial location, and the first axial location is axially spaced apart from the second axial location.

7. The apparatus of claim 1, wherein the container receptacle includes a plurality of support ribs extending longitudinally along an exterior surface of the container receptacle, each of the support ribs includes a slot configured to accommodate the grommet.

8. The apparatus of claim 1, wherein the vehicle panel defines a plurality of apertures, each aperture is configured to receive a respective attachment portion of the grommet for securing an outer portion of the grommet to the vehicle panel.

9. The apparatus of claim 1, wherein the grommet surrounds the container receptacle, and a shape of the grommet corresponds to a shape of the container receptacle.

10. The apparatus of claim 1, wherein the grommet is coupled to an upper end of the container receptacle.

11. A vehicle cup holder, comprising:
a vehicle panel;
an opening disposed in the vehicle panel;
a container receptacle configured to receive a beverage container, the container receptacle extends through the opening in the vehicle panel and defines a central axis; and
a grommet extending between and to the container receptacle and the vehicle panel, the grommet includes a central portion extending between an inner portion secured to the container receptacle and an outer portion secured to the vehicle panel, the central portion extending at an angle of between twenty degrees and eighty degrees with respect to the central axis of the container receptacle and configured to at least one of compress or stretch to absorb a vibration in the vehicle panel, and the container receptacle is isolated from the vehicle panel via the grommet.

12. The vehicle cup holder of claim 11, wherein the container receptacle is moveable with respect to the vehicle panel.

13. The vehicle cup holder of claim 12, wherein the grommet defines a closed loop and surrounds an exterior surface of the container receptacle.

14. The vehicle cup holder of claim 11, wherein the grommet is attached to an exterior surface of the container receptacle.

15. The vehicle cup holder of claim 11, wherein the vehicle panel defines a plurality of apertures, each aperture is configured to receive a respective attachment portion of the grommet for securing an outer portion of the grommet to the vehicle panel.

16. The vehicle cup holder of claim 11, wherein the container receptacle is mounted to the vehicle panel with the grommet.

17. A method comprising:
positioning a container receptacle to extend through an opening in a vehicle panel, the container receptacle is configured to receive a beverage container and defines a central axis;
positioning a grommet to extend between and to the container receptacle and the vehicle panel, the grommet includes a central portion extending between an inner portion secured to the container receptacle and an outer portion secured to the vehicle panel, the central portion extending at an angle of between twenty degrees and eighty degrees with respect to the central axis of the container receptacle;
isolating the container receptacle from the vehicle panel via the grommet; and
absorbing a vibration of the vehicle panel with the grommet, wherein the grommet is configured to at least one of compress or stretch to absorb the vibration.

18. The method of claim 17, further comprising positioning a portion of the grommet in a slot disposed on an exterior surface of the container receptacle.

19. The method of claim 17, further comprising moving an attachment portion of the grommet at least partially through an aperture disposed in the vehicle panel.

* * * * *